United States Patent [19]

Hastings

[11] 4,236,322
[45] Dec. 2, 1980

[54] APPARATUS FOR AND METHOD OF DRYING ITEMS BY OPEN AIR AND SOLAR ENERGY

[76] Inventor: Allen M. Hastings, 4700 Fawnwood Cove, Austin, Tex. 78735

[21] Appl. No.: 20,720

[22] Filed: Mar. 15, 1979

[51] Int. Cl.³ .................... F26B 11/02; F26B 17/24
[52] U.S. Cl. .......................................... 34/130; 34/8; 34/58; 34/93; 34/237; 34/239; 34/241
[58] Field of Search ................... 34/8, 35, 39, 58, 93, 34/237, 239, 241, 108, 130

[56] References Cited

U.S. PATENT DOCUMENTS

| | | | |
|---|---|---|---|
| 1,284,007 | 11/1918 | Whitcomb | 34/130 |
| 1,520,448 | 12/1924 | Smith | 34/93 |
| 2,707,339 | 5/1955 | Berge | 34/130 |
| 2,855,698 | 10/1958 | Hutt | 34/108 |
| 3,401,924 | 9/1968 | Hurst | 432/103 |
| 3,622,134 | 11/1971 | Mazza | 34/108 |
| 4,109,395 | 8/1978 | Huang | 34/219 |

FOREIGN PATENT DOCUMENTS 21558 of 1903 United Kingdom ............... 34/130

*Primary Examiner*—John J. Camby
*Attorney, Agent, or Firm*—Roylance, Abrams, Berdo & Farley

[57] ABSTRACT

A dryer which employs open air and solar energy for tumble drying of such items as clothes comprises a rotatable, closed drum and a frame. The drum has first and second end surfaces and a lateral surface. Each of the end surfaces and lateral surface has a plurality of orifices for permitting open air and solar energy to enter and moisture to exit the drum. An access door is attached to the drum and is movable between open and closed positions to permit loading and unloading of the drum. The frame on which the drum is mounted exposes the drum interior to open air and solar energy. Bearings are coupled to the drum and frame for rotatably supporting the drum on the frame. A mechanism for rotating the drum is mounted on the frame and coupled to the drum. The method of drying comprises loading the items to be dried in the drum and exposing the drum loaded with the items to the open air and solar energy while simultaneously rotating the drum to tumble dry the items in the drum.

7 Claims, 7 Drawing Figures

U.S. Patent  Dec. 2, 1980  Sheet 2 of 2  4,236,322
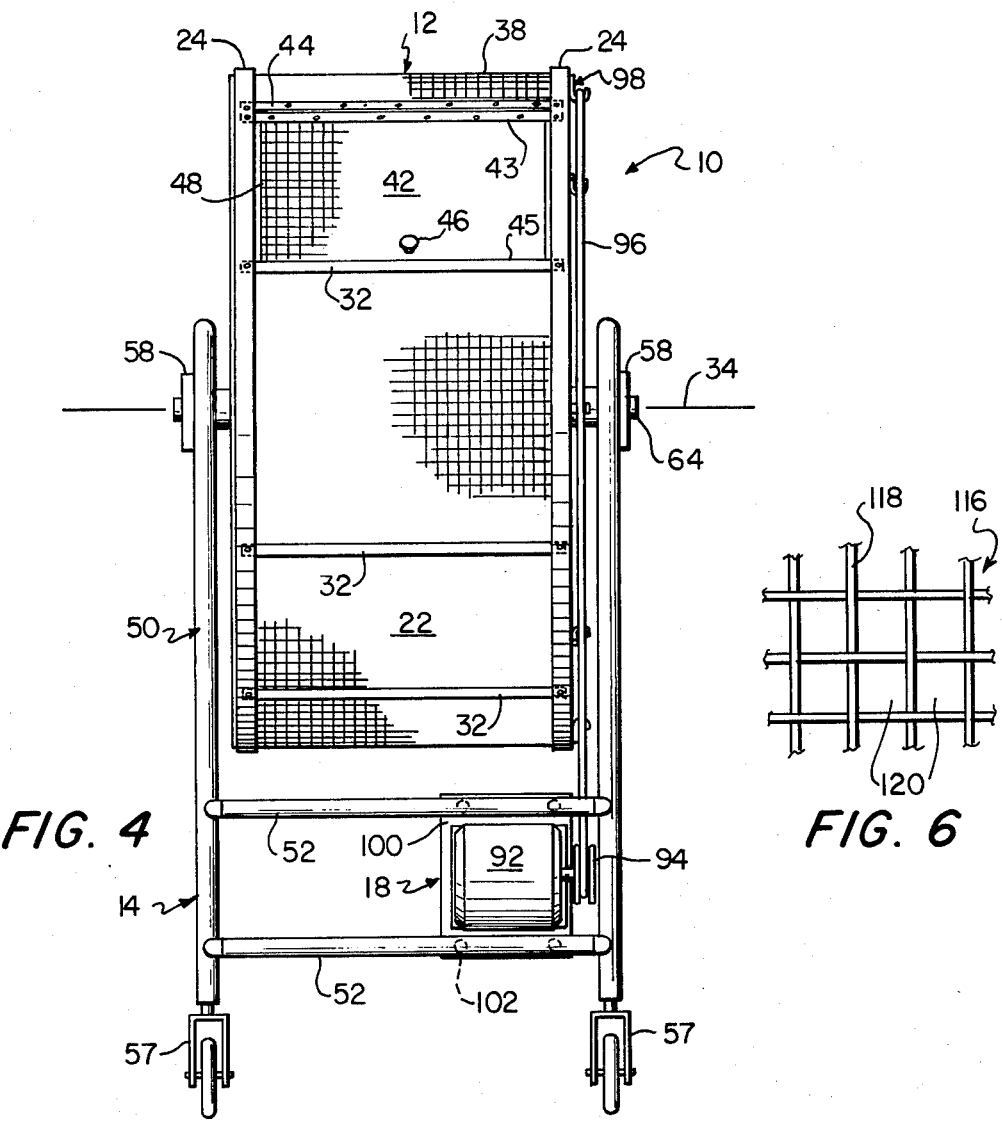
FIG. 4
FIG. 6
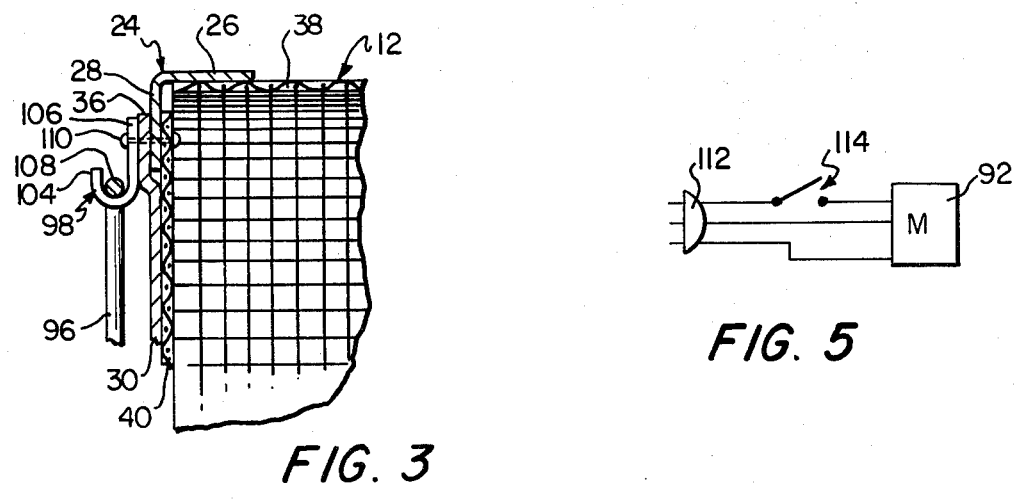
FIG. 3
FIG. 5

APPARATUS FOR AND METHOD OF DRYING ITEMS BY OPEN AIR AND SOLAR ENERGY

This invention relates to an apparatus and method for tumble drying items by open air and solar energy without the use of artificially produced heat.

BACKGROUND OF THE INVENTION

Known and conventional apparatus and methods of drying such items as clothes use electric or gas power to generate the heat used in drying the clothes. The use of electrical or gas power makes the operation of these prior art devices very expensive. In these prior art devices, the drum is invariably encased within a housing and does not have sufficient orifices in its end and lateral walls to enable these rotating drums to be used effectively for drying clothes solely by open air and solar energy. These devices and disadvantageous in that they are expensive to operate, and they consume important energy resources. Typical examples of these are disclosed in U.S. Pat. Nos. 45,521, Price; 2,752,694, McCormick; 2,814,130, Cayot; and 3,584,393, Menk.

Other known and conventional apparatus for drying clothes involve a rotating framework. However, these devices are merely facilitate the hanging of the clothes on each of the members of the frame and do not rotate for the purpose of drying or tumble drying the clothes. The drying operation of these devices is the same as that in a simple clothesline. Typical examples of these are disclosed in U.S. Pat. Nos. 29,151, Ferguson; 141,064, McMahon; and 1,474,281, Needler.

The prior art has also suggested the use of solar energy for use in drying various items. However, none of these devices involve a rotating drum to effect tumble drying of the items. Typical examples of these solar energy operated dryers are disclosed in U.S. Pat. Nos. 281,084, Kirkland; 1,073,729, Barnard; 1,362,216, Barnard et al; and 4,045,880, Steffen.

BRIEF DESCRIPTION OF THE INVENTION

It is an object of this invention to provide an apparatus and method for tumble drying such items as clothing by open air and solar energy without the use of artificially produced heat. More specifically, it is the object of this invention to tumble dry clothes by use of a closed rotating drum having a plurality of orifices in each of its surfaces and which is so mounted so as to permit it to be exposed to the flow of open air and solar energy for drying of the items.

Another object of the present invention is to provide a dryer for tumble drying of items which is of rugged construction, and inexpensive and simple to manufacture, maintain and operate.

Other objects, advantages and salient features of the present invention will become apparent from the following detailed description of the preferred embodiment of the present invention.

Briefly described, the apparatus of the present invention includes a dryer which employs open air and solar energy for tumble drying of such items as clothes comprising a rotatable, closed drum having first and second end surfaces and a lateral surface, each of the first and second end surfaces and the lateral surface having a plurality of orifices for permitting open air and solar energy to enter and moisture to exit the drum, and having access door means attached to the drum and movable between open and closed positions for permitting access to the interior of the drum, frame means on which the drum is mounted for exposing the drum to open air and solar energy, bearing means coupled to the drum and frame for rotatably supporting the drum on the frame for rotation about a rotational axis, and driving means coupled to the frame and drum for rotating the drum.

The method of the present invention includes a method of drying such items as clothes by open air and solar energy without artificially produced heat and comprising a first step of loading the items to be dried in a rotatable, closed drum having first and second end surfaces and a lateral surface with a plurality of orifices in each of the end and lateral surfaces for permitting open air and solar energy to enter and moisture to exit the drum, and a second step of exposing the drum loaded with items to open air and solar energy while simultaneously rotating the drum to tumble dry the items in the drum.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of the specification, and wherein:

FIG. 3 is an enlarged, fragmentary sectional side view of the dryer of the present invention taken along lines 3—3 of FIG. 1;

FIG. 4 is an end elevation of the dryer of FIG. 1;

FIG. 5 is a schematic diagram of the circuitry for the motor of the dryer of FIGS. 1 and 4; and FIG. 6 is an enlarged, fragmentary plan view of a section of the drum of the dryer of FIGS. 1 and 4.

DETAILED DESCRIPTION OF THE INVENTION

Figure 1:
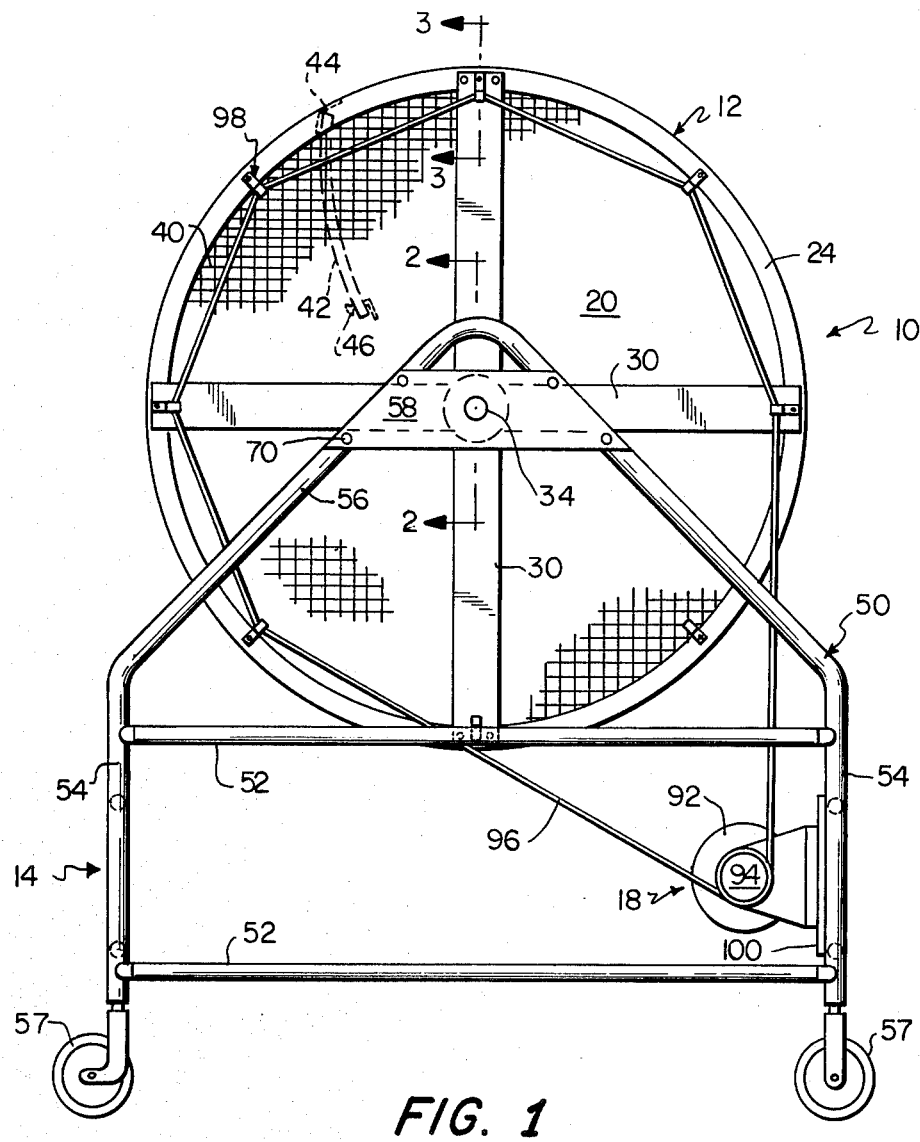
FIG. 1 is a elevation view of a dryer formed in accordance with the present invention.

Referring to FIGS. 1 and 4, the dryer 10 of the present invention comprises a rotatable closed drum 12 and a frame 14. A bearing structure indicated generally at 16 rotatably supports the drum 12 on the frame 14. A driving mechanism indicated generally at 18 is mounted on frame 14 and is coupled to the drum 12 for rotating the drum.

The drum 12 is in the form of a circular cylinder having first and second circular end surfaces 20 which are interconnedted by a cylindrical lateral surface 22. Ring supports 24 are provided at the ends of the drum 12 and circumscribe the first and second end surfaces 20. The ring supports 24 are L-shaped in cross section and have legs 26 and 28 (see FIG. 3). The axially inwardly extending leg 26 of each ring support 24 is oriented along the lateral surface 22 of the drum 12 while each vertical or radially extending leg 28 is oriented along one of end surfaces 20. Each ring support can be formed from a plurality of substantially identical arcuate members of equal length interconnected end-to-end, the lengths and number thereof being chosen depending on drum size.

Attached to the ring supports 24 are radial spokes 30 and axial braces 32. The radial spokes 30 are oriented perpendicular to one another and radiate outwardly from the rotational axis and center or longitudinal axis 34 of the cylindrical drum 12. The outermost ends of 36 of the radial spokes 30 are offset relative to the remainder of the spokes 30 in the area where the spokes 30 are connected to the vertical leg 28 of the ring support 24 (see FIG. 3). Each of the axial braces 32 extends parallel to the axis 34 and is attached at its opposite ends to the axially extending leg 26 of the ring support 24. The spokes 30 and braces 32 are fixed to the ring supports 24 by any suitable means, e.g., by fasteners, welding or an adhesive.

Attached to the inside of the ring supports 24 is a cylinder 38 of mesh-like or screen material which extends between the ring supports 24 and is attached to the axially extending legs 26. The cylinder 38 forms the lateral surface 22 of the drum 12. A disc 40 of the same mesh-like or screen material forms each of the end surfaces 20 and is attached to the vertical legs 28 of the ring supports 24. The cylinder 38 and the discs 40 are coupled to the ring supports 24 by suitable means, e.g., fasteners or welding.

An access door 42 is provided in the lateral surface 22 of the drum 12. The access door 42 is mounted between two of the axial braces 32. The same mesh-like material used to form the cylinder 38 and the discs 40 is employed to form the majority of the access door 42. On one side 43, the access door is coupled to an axial brace 32 by a spring-biased hinge 44. The spring-biased hinge 44 biases the access door 42 towards the closed position illustrated in FIG. 4 and away from the open position illustrated in FIG. 1. A conventional latch 46 is provided on the side 45 of the access door 42 opposite the spring-biased hinge 44. The latch 46 enables the side 45 of the access door to be releasably coupled to the adjacent axial brace 32 in order to releasably lock the door in the closed position. The access door 42 has a generally rectangular frame 48 which supports the mesh-like material of the door 42 and which is the portion of the door 42 on which the hinge 44 and the catch 46 are mounted. The access door 42 permits access to the interior of the drum 12 to enable the insertion and removal of items to and from the drum 12.

The frame 14 comprises two generally U-shaped end members 50 and eight support bars 52. The end members 50 comprise two vertical legs 54 which are connected by a V-shaped bight 56. Casters 57 are coupled to the free ends of legs 54 to facilitate moving of the dryer 10. Two support bars 52 extend between the vertical legs 54 of each end member 50. Additionally, two support bars extend from each vertical leg 54 to one of the vertical legs 54 of the other end member 50. The support bars 52 are coupled to the end members 50 by suitable means, e.g., welding or fasteners. By this arrangement, a simple and inexpensive, but sturdy, portable and lightweight frame for supporting the drum 12 is provided.

Figure 2:
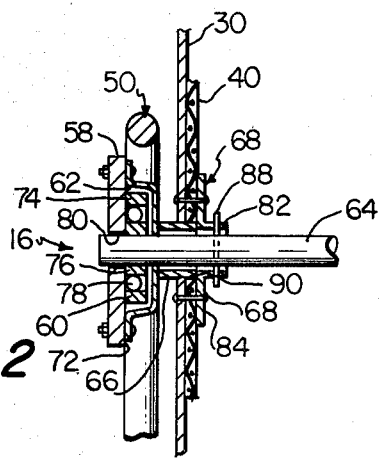
FIG. 2 is an enlarged, fragmentary sectional view of the dryer according to one embodiment of the present invention taken along lines 2—2 of FIG. 1.

As stated above, the bearing means 16 rotatably supports the drum 12 on the frame 14. Alternative arrangements for the bearing means 16 are illustrated in detail in FIG. 2 and FIG. 2A. Since the bearing means 16 is identical for each end of the drum 12, only one end need be and will be discussed. In the embodiment of FIG. 2, each bearing means 16 comprises a drum support 58, a bearing 60, a bearing retainer 62, a cylindrical shaft member 64, a sleeve 66 and a hub 68.

The drum support 58 is in the form of a trapezoidal plate which is affixed adjacent the apex of the V-shaped bight 56 by bolts or other fasteners 70. Alternatively, the drum supports 58 may be fixed to the bights 56 by welding. The bearings 60 are coupled to the inside face 72 of the drum support 58 by the bearing retainer 62. The bearings 60 may be of the ball-bearing type and comprise an outer race 74, an inner race 76 and ball bearings 78 therebetween. The inner race 76 is axially aligned with an opening 80 in the drum support 58.

The hub 68 comprises a cylinder portion 82, the axis of which is coincident with the axis 34. An annular radially extending portion 84 of the hub 68 abuts against the screen disc 40 and is fixed to the radial spokes 30 and the disc 40, which is fixed between the annular portion 64 and the spokes 30 by fasteners or rivets 68. An axially extending cylindrical portion 82 of the hub is coupled to the shaft 64 by a pin 88 which extends diagonally through a cylinder portion 82 and the shaft 64 so that the shaft 64, the hub 68 and the drum 12 are fixedly coupled to rotate together along with inner race 76.

The sleeve 66 has one end which abuts the bearing retainer 62 and an opposite end which abuts the hub 68. Aligned openings 90 are provided in between the radial spokes 30 and in the disc 40 so that the sleeve 66 may pass therethrough. By this arrangement, the drum 12 is spaced from the frame end members 50 to permit the drum 12 to rotate without being obstructed by the frame 14.

Figure 2A:
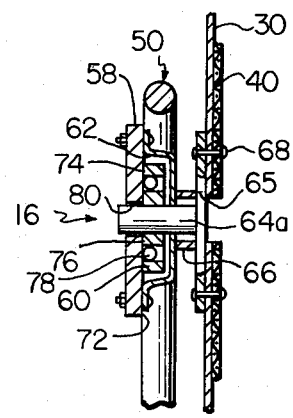
FIG. 2A is an enlarged, fragmentary sectional view of the dryer according to another embodiment of the present invention taken along lines 2—2 of FIG. 1.

In FIG. 2A, a somewhat simpler arrangement for the bearing means 16 is illustrated. In this embodiment, the drum support 58, the bearing 60, the bearing retainer 62 and the sleeve 66 are identical to those of the embodiment of FIG. 2, and therefore, need not be discussed in detail. However, the attachment of the shaft 64a to the drum 12 is different.

The shaft 64a is in two parts with one part located at each end of the drum 12. Each part of the shaft 64a is fixed to a mounting plate 65. The mounting plate 65 is fixed to the radial spokes 30 and to the drum 12 by suitable fasteners 68. The drum 12 is spaced from the end members 50 by the sleeve 66 which abuts the retainer 62 and the plate 65 to permit the drum to rotate without being obstructed by the frame 14.

The drive mechanism 18 comprises an electric motor 92, a pulley 94, a belt 96 and belt guides 98.

The motor 92 is fixed by suitable bracket means to a motor support 100 which is in turn fixed to two of the support bars 52, e.g., by bolts 102. The pulley 94 is coupled to the output shaft of motor 92 to be rotatably driven thereby.

The belt 96 passes around pulley 94 and is coupled to the drum. This coupling can take more than one form, and can be provided by forming a belt guide channel in, or on, axially extending leg 26 of the one of the end rings which is in, or close to, the plane containing pulley 94. Alternatively, a plurality of belt guides can be attached to the outer surface of leg 28, one of these belt guides 98 being best illustrated in FIG. 3. Each J-shaped belt guide 98 has a short leg 104 and a long leg 106 which define a belt-receiving channel 108 therebetween. A fastener 110 extends through the long leg 106, the offset end 36 of the radial spoke 30, the vertical leg 28 of the ring support 24 and the disc 40.

Referring again to FIG. 1, it is seen that a plurality of the belt guides 98 are fixed around the ring support 24, substantially uniformly spaced apart, so that the slots 108 thereof extend in a direction radially outwardly from the rotational axis 34. The belt guides 98 affixed between the spokes 30 are attached directly to the vertical leg 28 of the ring support 24. Although eight ring guides 98 are illustrated in FIG. 1, any appropriate number may be provided, which number depends on the size of the drum 12.

The belt 96 passes around the pulley 94 and is located in the slots 108 of the belt guides 98. Upon actuation of the motor 92, the pulley 94 is rotated. Rotation of the pulley 94 causes the belt 96 to move and the drum 12 to rotate about the axis 34.

The electrical circuitry for the motor 92 is schematically illustrated in FIG. 5. The plug 112 may be inserted in a conventional household or industrial socket to supply electrical power to the motor 92. A switch 114 is provided in the circuitry to facilitate actuation of the motor 92 by controlling the supply of electrical power thereto.

An enlarged section of mesh-like material 116 employed to form the cylinder 38 and the discs 40 is illustrated in FIG. 6. The filaments 118 define openings 120 therebetween which comprise the major portion of the surface area of the material 116 and which permit open air and solar energy to enter and moisture to exit the drum. The material 116 may be formed of metal or plastic.

In operating the dryer 10, the access door 42 is opened and the items to be dried are placed within the interior of the drum 12. After loading of the drum 12, the access door is closed and latched in place by the latch 46. The dryer 10 is located in an area where it is in open air, i.e., outdoors, and preferably in a location in which it is exposed to direct sunlight while the motor is energized to rotate the drum 12. During rotation of drum 12, braces 32 enhance air flow and aid tumbling of clothes.

From the above description it is clear that a new low cost dryer had been developed which for the first time combines the relative inexpensiveness of hanging clothes on a clothesline together with the benefits of tumble drying. With the present invention, the time-consuming chore of hanging clothes on the line is avoided. Moreover, the present invention may be used with modern tumble dry fabrics which may not be hung on a line since they dry with wrinkles when they are hung on a line. The dryer 10 is also advantageous in that it will not overheat or produce hot spots, will not create a lint buildup and will rid itself of lint in a manner superior to hanging clothes on a line and conventional home clothes dryers.

While advantageous embodiments have been chosen to illustrate the invention, it will be understood by those skilled in the art that various changes and modifications can be made therein without departing from the scope of the invention as defined in the appended claims.

What is claimed is:

1. A clothes dryer which empolys open air and solar energy for tumble drying clothes comprising
   a rotatable, closed drum for receiving clothes having first and second end surfaces and a lateral surface, each of said first and second end surfaces and said lateral surface having a plurality of orifices for permitting open air and solar energy to enter and moisture to exit said drum to dry the clothes, and having access door means attached to said drum and movable between open and closed positions for permitting access to the interior of said drum;
   frame means on which said drum is mounted for exposing said drum to open air and solar energy;
   bearing means coupled to said drum and said frame for rotatably supporting said drum on said frame for rotation about a rotational axis; and
   driving means coupled to said frame and said drum for rotating said drum, said driving means having
      a motor having a pulley coupled thereto and driven thereby,
      belt guide means fixedly and directly coupled to one end of said drum adjacent to said lateral surface, and
      a belt directly coupling said pulley to said belt guide means to transmit rotary power from said motor to said drum.

2. A dryer according to claim 1, wherein said drum is formed of a mesh-like material.

3. A dryer according to claim 1, wherein said orifices comprise the majority of said surfaces of said drum.

4. A dryer according to claim 1, wherein said drum is in the form of a cylinder having a longitudinal axis and said bearing means supports said drum so that said longitudinal axis of said cylinder and said rotational axis coincide.

5. A dryer according to claim 4, wherein said access door means is located in said lateral surface.

6. A dryer according to claim 1, wherein said belt guide means comprises a plurality of separate, spaced apart guides having belt-receiving slots therein which open in a radially outward direction from said rotational axis.

7. A dryer according to claim 1, wherein said bearing means comprises
   bearings mounted in opposite ends of said frame;
   a cylindrical member extending along said rotational axis having opposite ends mounted in said bearings to rotate relative to said frame, said drum being fixedly coupled to said cylindrical member to rotate therewith.

* * * * *